(12) United States Patent
Ko

(10) Patent No.: US 6,192,479 B1
(45) Date of Patent: Feb. 20, 2001

(54) DATA PROCESSING WITH PROGRESSIVE, ADAPTIVE, CPU-DRIVEN POWER MANAGEMENT

(75) Inventor: Uming Ko, Plano, TX (US)

(73) Assignee: Texas Instruments Incorporated, Dallas, TX (US)

( * ) Notice: Under 35 U.S.C. 154(b), the term of this patent shall be extended for 0 days.

(21) Appl. No.: 08/375,148

(22) Filed: Jan. 19, 1995

(51) Int. Cl.[7] .................................. G06F 1/26; G06F 1/32
(52) U.S. Cl. .............................................. 713/300; 713/322
(58) Field of Search .................................... 713/300, 320, 713/321, 322, 323, 324; 710/15, 18, 240

(56) References Cited

U.S. PATENT DOCUMENTS

| 5,218,704 | 6/1993 | Watts, Jr. et al. . |
| 5,396,635 | * 3/1995 | Fung . |
| 5,485,127 | 1/1996 | Bertoluzzi et al. . |
| 5,504,910 | * 4/1996 | Wisor et al. . |
| 5,710,929 | * 1/1998 | Fung . |

OTHER PUBLICATIONS mips Open RISC Technology, "R4200 Microprocessor, Preliminary Product Information", R4200 Preliminary Datasheet Rev. 1.3, Oct. 1993, pp. 1–36.

* cited by examiner

Primary Examiner—Gopal C. Ray
(74) Attorney, Agent, or Firm—Robert D. Marshall, Jr.; W. James Brady, III; Frederick J. Telecky, Jr.

(57) ABSTRACT

The power consumption of a single chip data processing device (21) is controlled. An activity meter (53) signals the activity level of at least one functional unit (FU). A clock arbiter (51) has three states: an up state; a hold state; and a down state. The clock arbiter progresses from the up state to the hold state and from the hold state to the down state when the activity level is below a predetermined activity threshold. The clock arbiter progresses from the down state to the hold state and from the hold state to the up state when the activity level is above the predetermined activity threshold. A clock generating circuit (43, 45, 47) supplies a clock signal periodically increasing in frequency responsive to the up state, unchanging in frequency responsive to the hold state and periodically decreasing in frequency responsive to the down state.

12 Claims, 3 Drawing Sheets

DATA PROCESSING WITH PROGRESSIVE, ADAPTIVE, CPU-DRIVEN POWER MANAGEMENT

FIELD OF THE INVENTION

The invention relates generally to data processing and, more particularly, to power management techniques in data processing.

BACKGROUND OF THE INVENTION

Data processing systems are used in myriad applications which touch virtually every aspect of life. In applications where the data processing system uses battery power for any substantial length of time, it is particularly desirable to be able to minimize the power consumption of the data processing system. Examples of systems wherein battery power is used for substantial periods of time include portable data processing systems such as notebook and sub-notebook computer systems, and data processing systems which are employed in remote locations, hazardous weather areas, or earthquake prone areas.

In applications which require high performance from a data processing system, the high performance requirement often presents a heat dissipation problem. As a result, most high performance data processing devices use expensive packages such as ceramic pin grid arrays in order to provide heat dissipation capabilities adequate to avoid overheating the data processing device.

In addressing the power management issues presented by the above-described circumstances, it is known that the power dissipation of a data processing system having a fixed operating voltage is given by the following equation:

$$P = CV^2 f,$$

where P is the power dissipated, C is the effective power dissipation capacitance, V is the operating voltage and f is the effective transition frequency. Thus, the dissipated power P can be reduced by reducing the effective transition frequency f.

In one known approach to reducing the effective transition frequency f, a data processing device can divide down its own clock frequency in response to an external stimulus. For example, one known conventional RISC microprocessor has a reduced power mode of operation wherein it responds to an external stimulus to reduce its internal clock frequency by 75%. As noted above, however, the data processing system must be capable of providing the data processing device, in this case the RISC microprocessor, with the necessary external hardware/software intervention to cause the microprocessor to switch among its available power-conserving states.

FIG. 1 illustrates one example of the above-described conventional approach wherein a microprocessor (CPU 11 in FIG. 1) responds to external stimulus from elsewhere in the data processing system 13 to switch into a power-conserving state, for example by reducing its internal clock frequency by 75%. The external stimulus is provided to CPU 11 in FIG. 1 in the form of the control CPU clock signal. The control CPU clock signal is output from an activity monitor 15 which receives system activity information from various components of the data processing system 13. Thus, each illustrated component of the data processing system 13, namely, the graphics controller, the hard-disk drive, the floppy drive, the keyboard, the mouse, the serial interface unit, the parallel interface unit, and the bus interrupt controller provides the activity monitor 15 with information regarding its own individual activity. The activity monitor 15 includes an activity meter 17 which maintains a record of the activity of each system component. When the system activity, as represented by the activity inputs from the individual system components, is sufficiently low, the activity monitor 15 provides CPU 11 with the control CPU clock signal, and the internal clock frequency of the CPU 11 is reduced in response to this control CPU clock signal. The basic idea of the system of FIG. 1 is that, when the system activity is sufficiently low, the CPU activity will also be correspondingly low, so that the clock frequency of the CPU can be reduced without substantially impairing system performance.

However, the present invention recognizes that, as more cache is provided on-chip with the microprocessor, it is more difficult to draw conclusions about the CPU activity by observing the activity of the external system components. For example, although the individual system components may appear to be idle, the CPU itself may well be busy due to increased utilization of on-chip cache. Under these circumstances, the activity monitor 15 would direct the CPU 11 to reduce its clock frequency, thus disadvantageously increasing the time required for the CPU to perform its current, albeit externally undetectable, tasks. It is desirable therefore to provide a power management technique which is capable of detecting internal CPU activity and which controls the CPU for high performance when necessary, but automatically reduces the power consumption of the CPU as conditions warrant.

The present invention provides a CPU-driven power management technique capable of detecting internal CPU activity and controlling the CPU for high performance when necessary, while automatically reducing the CPU's power consumption as conditions warrant.

DETAILED DESCRIPTION OF THE INVENTION

Figure 1:
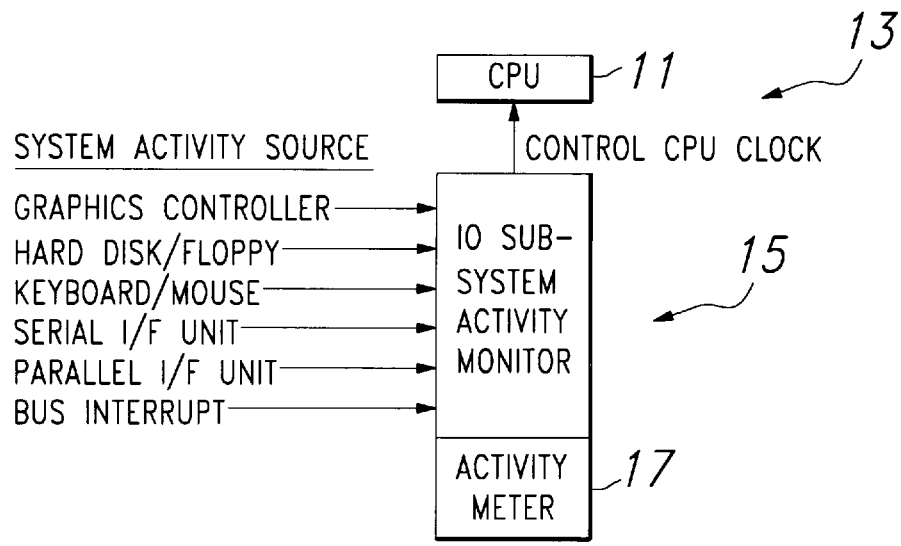
FIG. 1 illustrates a conventional approach to power management in a data processing system.
Figure 2:
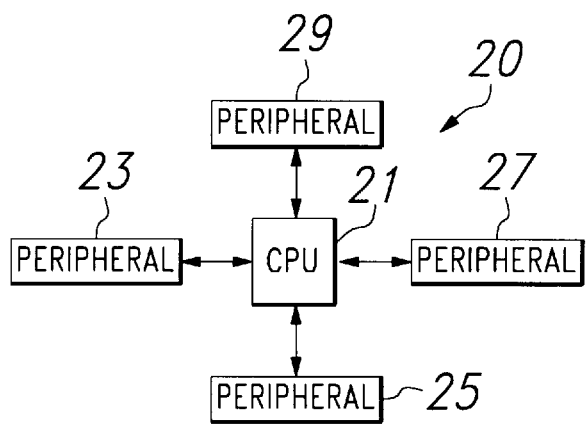
FIG. 2 illustrates a data processing system according to the present invention.

FIG. 2 is a block diagram of a data processing system 20 according to the present invention. The data processing system 20 includes data processing circuitry 21, embodied in FIG. 2 as a single-chip CPU or microprocessor, and peripheral devices 23, 25, 27 and 29. In the exemplary embodiment of FIG. 2, the CPU 21 is connected to each of the peripheral circuitries 23, 25, 27 and 29 for transfer of information between CPU 21 and peripheral circuitries 23, 25, 27 and 29. However, and as will be apparent from the following description, a data processing system according to the present invention could include any quantity and type of peripheral circuitries and peripheral devices (such as peripherals 23, 25, 27 and 29) interconnected among themselves and with CPU 21 in any manner heretofore or hereafter conceivable to workers in the art. For example, peripherals 23, 25, 27 and 29 could represent any desired combination of the system components discussed above with respect to FIG. 1.

Figure 3:
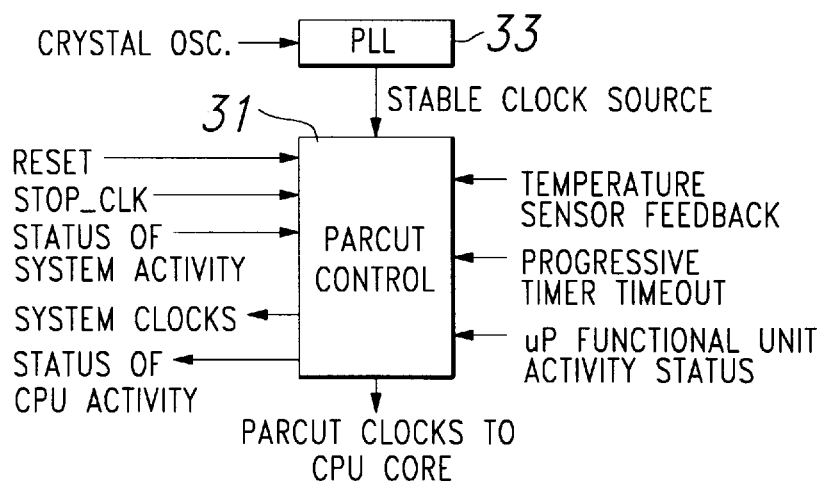
FIG. 3 illustrates a portion of the CPU of FIG. 2 which implements the power management techniques of the present invention.

FIG. 3 illustrates in more detail a portion of the CPU 21 of FIG. 2. The exemplary arrangement of FIG. 3 includes a controller 31 which implements a Progressive, Adaptive, Reliable, CPU-Driven, User-Transparent (PARCUT) power management technique. The PARCUT controller 31 receives a stable clock signal from a phase locked loop (PLL) 33 that is driven by the output of a crystal oscillator. The phase locked loop 33 of FIG. 3 may be provided either on-chip or off-chip relative to the CPU 21 of FIG. 2. The PARCUT controller 31 of FIG. 3 receives the stable clock signal from the phase locked loop 33, and produces PARCUT clock signals which are output to the data processing circuitry within the core of CPU 21. The PARCUT controller 31 may also be used to provide system clock signals for clocking various peripheral circuitries external to CPU 21 in data processing system 20, such as peripherals 23, 25, 27 and 29. Various control parameters utilized by the PARCUT controller 31 are shown diagrammatically in FIG. 3 for clarity of understanding. However, the detailed structure and operation of the PARCUT controller 31 is best understood with reference to FIGS. 3 and 4.

Figure 4:
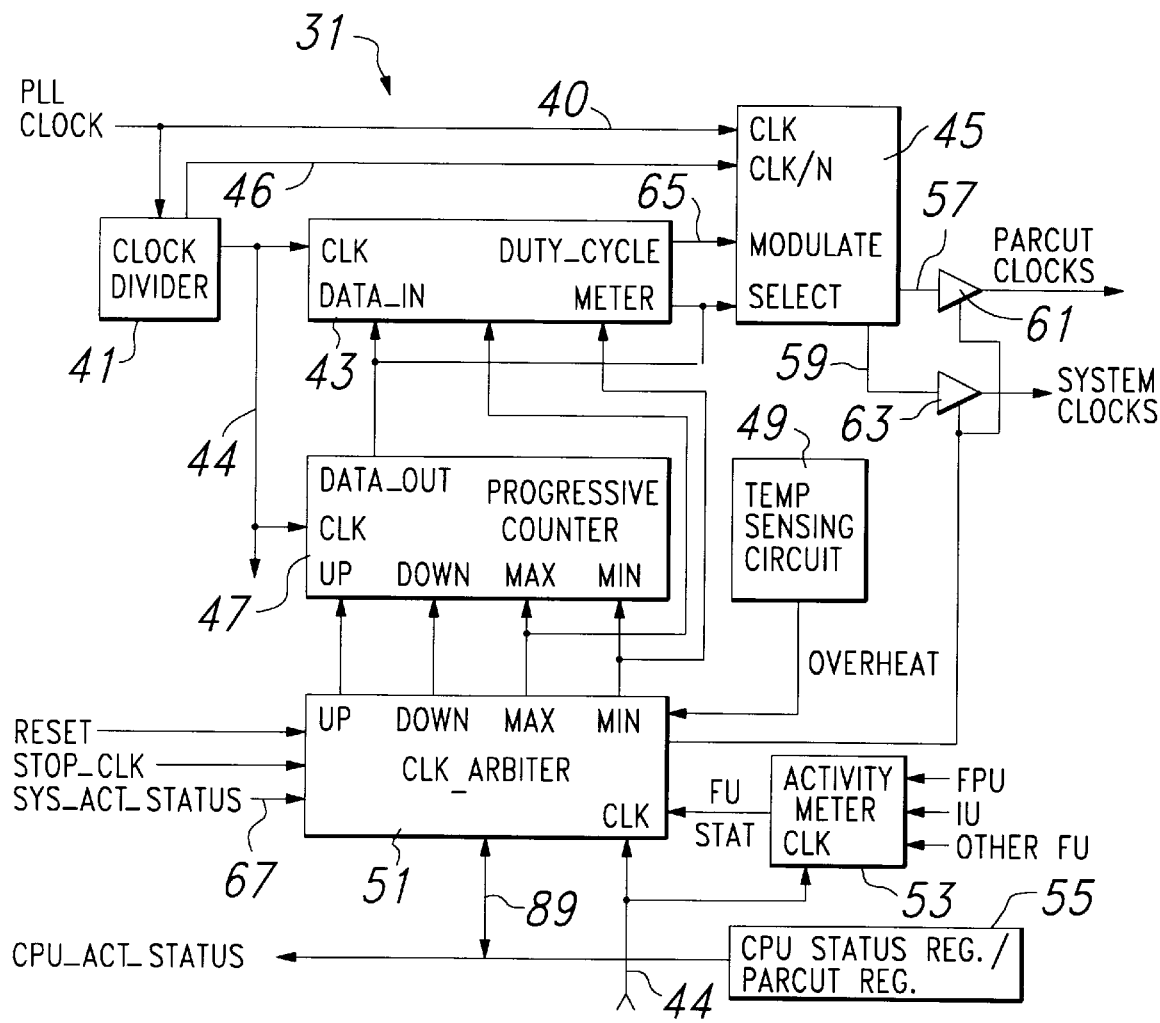
FIG. 4 illustrates the control circuitry of FIG. 3 in greater detail.

As shown in exemplary FIG. 4, the PARCUT controller 31 includes a clock divider 41, a duty cycle meter 43, a clock scaler/selector 45, a progressive counter 47, a temperature sensing circuit 49, a clock arbiter 51, an activity meter 53 and a CPU status register (PARCUT register) 55. The stable clock signal 40 from the PLL 33 is input to clock divider 41 and to clock scaler/selector 45. The clock divider 41 outputs a divided down version 44 of the PLL clock 40 to the duty cycle meter 43, the progressive counter 47, the clock arbiter 51 and the activity meter 53, and outputs a plurality of divided down versions 46 of the PLL clock 40 to the clock scaler/selector 45. The clock scaler/selector 45 outputs a first plurality of clock signals at 57 and a second plurality of clock signals at 59. The clock signals at 57 are selectively connected to and disconnected from the PARCUT clocks output of PARCUT controller 31 by operation of buffer/drivers 61, and the clock signals at 59 are selectively connected to and disconnected from the system clocks output of the PARCUT controller 31 by operation of buffer/divers 63.

The duty cycle meter 43 includes counter circuitry and comparison circuitry for comparing the output of the counter circuitry with data presented at the data input of duty cycle meter 43. When the counter output matches the data input, the comparison circuitry outputs a match signal 65 which is connected to the modulate input of clock scaler/selector 45. The data input of duty cycle meter 43 is connected to the data output of the progressive counter 47. As described hereinbelow, in an alternative embodiment, the data output of progressive counter 47 is connected to a select input of clock scaler/selector 45.

The progressive counter 47 includes up/down counter circuitry having a count output which defines the data output of progressive counter 47. The progressive counter 47 also includes circuitry responsive to an input "max" for immediately loading the data output of progressive counter 47 with a maximum data value, and circuitry responsive to an input "min" for immediately loading the data output of progressive counter 47 with a minimum data value. The max input of progressive counter 47 is connected to a max output of clock arbiter 51, and the min input of progressive counter 47 is connected to a min output of clock arbiter 51. Progressive counter 47 also includes an up input and a down input which are respectively are connected to up and down outputs of the clock arbiter 51. When the up input of progressive counter 47 is active (for example logic 1), then the data output of progressive output 47 counts upwardly (increments) with each clock pulse. Similarly, when the down input of progressive counter 47 is active, then the data output of progressive counter 47 counts downwardly (decrements) with each clock pulse. When the max input of progressive counter 47 is active, the data output of progressive counter 47 is immediately set to a maximum data value. When the min input of progressive counter 47 is active, then the data output of progressive counter 47 is immediately set to a minimum data value.

The clock arbiter 51 includes up, down, max and min outputs which are applied to the corresponding inputs of the progressive counter 47. The max and min outputs are also input to the duty cycle meter 43. The clock arbiter 51 receives an overheat signal from temperature sensing circuit 49, a functional unit status signal (FU stat) signal from activity meter 53, a system activity status input 67, a reset signal and a stop clock signal (STOP_CLK).

The reset signal is provided from an external terminal of the CPU 21 upon power up of the system 20, or when a reset command is issued (e.g. by an operator) for the system 20.

In the exemplary embodiment of FIG. 4, the counter circuit of duty cycle meter 43 is a six bit down counter which counts from 63 through 0 and then wraps back around to 63. When the count reaches 63, the duty cycle meter loads the data at its data input. When the max output of clock arbiter 51 is active, the duty cycle meter 43 disables the down counter and activates output 65. When the min output of clock arbiter 51 is active, the duty cycle meter 43 disables the down counter and deactivates output 65.

The up/down counter circuitry of progressive counter 47 is also a six bit counter which counts upwardly from 0 to 63 and downwardly from 63 to 0. During up counting, the counter will count up to 63 and remain at 63 until the down or min inputs become active, and during down counting, the counter will count down to 0 and remain at 0 until the up or max inputs become active.

It is also assumed for exemplary descriptive purposes that the clock 40 from PLL 33 has a frequency of 100 MHz and the clock signal 44 input to duty cycle meter 43 and progressive counter 47 has a frequency of 10 KHz.

Figure 6:
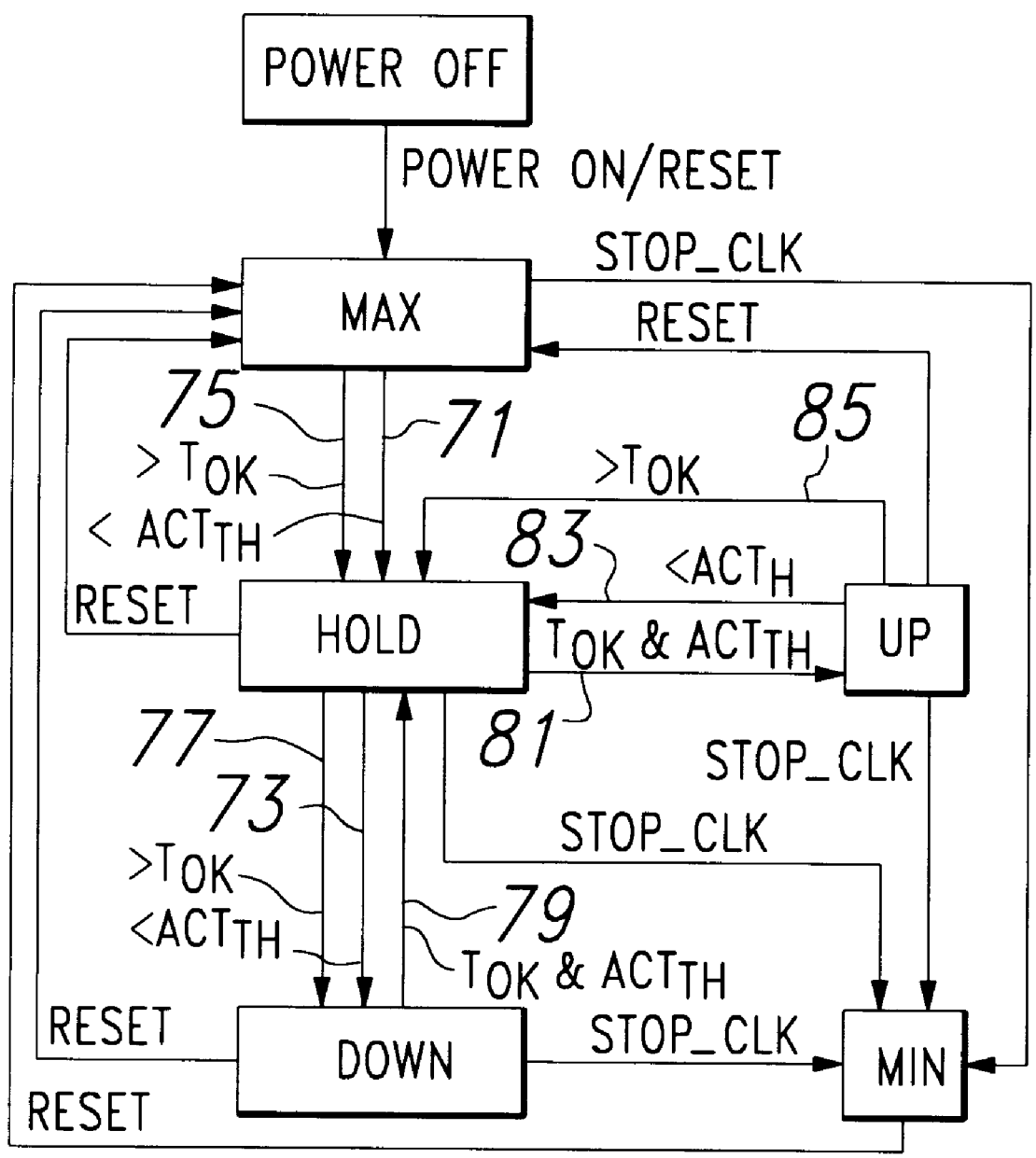
FIG. 6 is a state diagram of the clock arbiter of FIG. 4.

Clock arbiter 51 includes state machine circuitry responsive to the reset signal, the stop clock signal, the overheat signal from temperature sensing circuit 49, and the functional unit status signal FU stat from activity meter 53 to assume one of four states, namely, up, down, max and min to thereby activate the corresponding output signal of clock arbiter 51. The state machine circuitry may also assume a fifth state, namely a hold state, wherein the up, down, max and min inputs are inactive. FIG. 6 illustrates a state diagram of the exemplary state machine circuitry included in clock arbiter 51. The state machine circuitry operates synchronously with the 10 KHz clock signal 44.

Referencing FIGS. 4 and 6, at system power on/reset, the reset signal is active and the clock arbiter state machine assumes the max state and sets the max output to logic 1. This causes the progressive counter 47 to set the data output thereof to the maximum data value of 63, and also disables the down counter of duty cycle meter 43 and activates the output 65 of duty cycle meter 43. With its modulate input activated by output 65, the clock scaler/selector will pass the 100 MHz clock signal 40 received from the PLL 33 directly through for input as a PARCUT clock signal to the CPU core for as long as its modulate input is active. The clock scaler/selector passes 100 MHz through to the PARCUT clock while the modulate input is active, and switches to pass 0 MHz through when the modulate input becomes inactive. The output 65 of duty cycle meter 43 is active for as long as max is active, and also becomes active after the occurrence of a match between the data input value of duty cycle meter 43 and the count value of its internal counter. Further, the duty cycle meter output 65 becomes inactive again each time the internal down counter reaches a count value of 0. The output 65 is also maintained inactive for as long as min is active.

While the clock arbiter 51 is in the max state and the 100 MHz clock is produced by the clock scaler/selector 45, the clock arbiter monitors the functional unit activity status signal FU stat received from the activity meter 53. The activity meter 53 receives module enable signals associated with various on-chip functional units, or modules, of the CPU 21. For example, FIG. 4 illustrates module enable signals associated with the floating point unit (FPU), the integer unit (IU), and other functional units (FU). In the exemplary embodiment of FIG. 4, the activity meter 53 includes an up counter clocked by the 10 KHz clock 44. Whenever one of the functional units is accessed by assertion of its module enable signal, the module enable signal clears the counter in activity meter 53. For example, when the floating point unit FPU is accessed, the module enable signal used to initiate that access is also used to clear the counter of the activity meter 53. Similarly, if the integer unit IU is accessed, then its module enable signal clears the counter of activity meter 53. The counter in activity meter 53 maintains its maximum count until it is cleared by one of the module enable signals. Thus, as the count output increases, this provides an indication of the time which has elapsed since the last access of any of the monitored functional units of CPU 21. The count output is provided in the functional unit activity status signal FU stat which is latched into the clock arbiter 51 during each cycle of the 10 KHz clock 44. If the FU stat signal from the activity meter 53 indicates that the elapsed time since the last functional unit activity is more than a predetermined threshold, then the clock arbiter 51 inactivates the max output thereof and assumes the hold state wherein all clock arbiter outputs are inactive. This is also indicated in FIG. 6 by path 71, which shows that the clock arbiter changes from the max state to the hold state when the functional unit activity is less than a predetermined activity threshold $ACT_{TH}$.

With all clock arbiter outputs inactive in the hold state, the progressive counter 47 is disabled and the down counter of the duty cycle meter 43 is enabled. With progressive counter 47 still outputting the number 63 to the duty cycle meter, the output 65 of the duty cycle meter 43 is inactive for one out of every 64 cycles of the clock 44, and is active for the other 63 cycles, resulting in a PARCUT clock frequency of 98.4 MHz.

During the next cycle of clock 44 after the assuming the hold state, the clock arbiter 51 again latches in the FU stat signal. If the FU stat signal still indicates that the elapsed time since the last functional unit activity is more than the threshold, then the clock arbiter 51 changes from the hold state to the down state as shown at 73 in FIG. 6. With the down output now asserted by clock arbiter 51, the progressive counter 47 will receive the down input, and the data output of the progressive counter 47 will decrement to 62 upon the next pulse of the 10 KHz clock 44. Thus, the data input to duty cycle meter 43 is 62. When the down counter output in duty cycle meter 43 reaches 62, a match occurs and the signal at 65 becomes active to drive the modulate input of clock scaler/selector 45, causing the clock scaler/selector 45 to pass 100 MHz through to the PARCUT clock output. The clock scaler/selector maintains this 100 MHz output until the modulate signal becomes inactive again, that is, until the internal down counter of duty cycle meter 43 reaches 0. This operation results in a 96.8 MHz PARCUT clock.

Recalling that both the duty cycle meter 43 and the progressive counter 47 count at the same clock rate, the invention provides a progressive adaptive operation wherein the data output of progressive counter 47 can be increasing or decreasing while the down counter of duty cycle meter 43 counts downward to match the data output of progressive counter 47.

If the functional unit activity continues to be less than the threshold $ACT_{TH}$, then the clock arbiter 51 will continue to assert the down signal, thereby causing the up/down counter of progressive counter 47 to continue counting downward. As the data input of duty cycle meter 43 continues to decrease with the downward counting of progressive counter 47, the match of the data input with the count value in duty cycle meter 43 occurs later in the down count sequence, thus causing the output 65 to be inactive for a longer period of time which in turn causes the modulate input of clock scaler/selector to pass a 0 MHz signal through clock scaler/selector 45 for a longer period of time, which in turn decreases the effective frequency of the PARCUT clock.

The clock arbiter 51 also changes from the max state to the hold state in response to an overheat signal latched from the temperature sensing circuit 49 during each cycle of clock 44. This state change is shown by path 75 in FIG. 6 which indicates that the temperature is greater than an acceptable temperature $T_{OK}$ (i.e., an overheat condition). During the next cycle of clock 44, the clock arbiter 51 again latches in the overheat signal from temperature sensing circuit 49. If the overheat signal is still active, indicating that the overheat condition still exists, then clock arbiter 51 assumes the down state as shown by path 77 in FIG. 6, and activates the down output.

Once the clock arbiter assumes the down state and asserts the down output, it will normally remain in that state until the overheat signal from the temperature sensing circuit 49 and the functional unit activity status signal from the activity meter 53 indicate that the temperature is okay and the predetermined activity threshold $AC_{TH}$ has been met. Under these conditions, the clock arbiter 51 will follow path 79 of FIG. 6 to assume the hold state and, if these conditions persist during the next cycle of clock 44, will then follow path 81 to assume the up state and provide the up signal to progressive counter 47. While the clock arbiter remains in the up state, the progressive counter 47 will count upwardly with the 10 KHz clock 44, thus gradually increasing the amount of time that signal 65 is asserted to the modulate input of clock scaler/selector 45 and effectively increasing the frequency of the PARCUT clock provided by clock scaler/selector 45. Once the clock arbiter 51 has assumed the up state, it will normally remain therein until such time as the functional unit activity status signal FU stat from activity meter 53 indicates that the activity has dropped below the threshold $ACT_{TH}$, which causes the clock arbiter to assume the hold state as indicated by path 83 in FIG. 6, or until the overheat signal from temperature sensing circuit 49 becomes active to indicate that the temperature of the CPU is greater than an acceptable temperature $T_{OK}$, whereupon the clock arbiter will also transition from the up state into the hold state as shown by path 85 of FIG. 6.

The clock arbiter 51 will normally remain in the hold state until the FU stat signal and/or the overheat signal causes a state change along one of the paths 77, 73 or 81 of FIG. 6.

Figure 5:
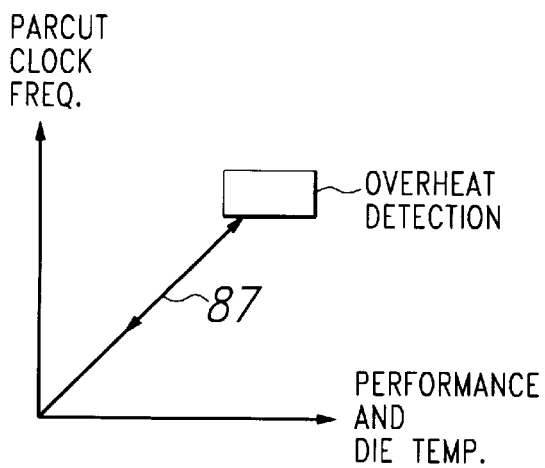
FIG. 5 graphically illustrates the progressive, adaptive operation of the power management technique according to the present invention.

FIG. 5 graphically illustrates the performance of the PARCUT controller 31 of FIGS. 4 and 6. The line 87 illustrates the progressive, adaptive adjustments of the PARCUT clock frequency in response to the CPU die temperature and the required performance (as represented by the functional unit activity status FU stat). As the required performance increases, the PARCUT clock frequency increases progressively along the line 87. As the required performance decreases, the PARCUT clock frequency progressively decreases along the line 87. Also, when the CPU die temperature reaches an overheating temperature range, the PARCUT clock frequency progressively decreases along line 87.

The above-described progressive changing of the PARCUT clock frequency by the operation of the progressive counter 47 can be overridden by the reset signal and the STOP_CLK signal of FIG. 4. In particular, the reset signal, when active, causes the clock arbiter to assume the max state which causes the progressive counter 47 to load the maximum count value (63 in the above-described example) at its data output and which disables the down counter of duty cycle meter 43 and activates output 65 of duty cycle meter 43. Similarly, when the STOP_CLK signal is active, the clock arbiter assumes the min state, which causes the progressive counter 47 to load the minimum count value of 0 at its data output and which disables the down counter of duty cycle meter 43 and deactivates output 65 of duty cycle meter 43. Thus, the reset and STOP_CLK signals provide the user with the capability of, for example, asserting the reset and STOP_CLK signals from the keyboard to effectively bypass the operation of progressive counter 47 and duty cycle meter 43 and immediately set the PARCUT clock frequency to its maximum (100 MHz in the above example) or to 0.

The activity meter 53 in FIG. 4 may also include additional counters for counting the number of accesses of the respective functional units. The respective module enable signals may be used to clock the respective counters, thus providing information regarding the activity of the individual functional units of CPU 21. This information may be provided to the clock arbiter 51 in the functional unit activity status signal FU stat. If one or more of the monitored functional units has not been accessed for a predetermined period of time, then the clock arbiter 51 disables the appropriate buffers/drivers 61 to disconnect the PARCUT clocks which drive those particular functional units. Thus, the individual functional units within CPU 21 can be shut down immediately when they are idle, and the clock arbiter 51 can enable the appropriate buffers to re-apply the PARCUT clocks to those functional units when they are accessed again.

It should be noted in FIG. 4 that the clk/n input of clock scaler/selector 45 may include many divided down versions of the PLL clock 40. Because the various functional units of CPU 21 need not all operate at the same clock frequency, the PLL clock 40 and the divided down clocks can be provided, through individual buffer/drivers 61, as PARCUT clocks to the various functional units within the CPU 21. It is therefore recognized that the different PARCUT clocks output from the buffer/drivers 61 may have differing nominal frequencies. However, all of these nominal frequencies will be affected in the same way by the operation of clock scaler/selector 45 in response to signal 65 received at its modulate input. For example, if one of the PARCUT clocks has a nominal frequency of 100 MHz and another of the PARCUT clocks has a nominal frequency of 80 MHz, and if the data input of duty cycle meter 43 is set at 32, then the 100 MHz clock signal will be effectively scaled to 50 MHz by operation of the clock scaler/selector 45 in response to the signal 65, and the nominal 80 MHz clock signal will be scaled to 40 MHz by operation of the clock scaler/selector 45 in response to the signal 65 received at its modulate input. Also as mentioned above, the clock arbiter 51 may disable appropriate buffer/drivers 61 to completely disconnect selected ones of the PARCUT clocks from their associated functional units if those functional units have been idle for a sufficient amount of time.

In the above-described operation of the PARCUT controller 31, the clock scaler/selector 45 operates as a clock scaler. However, in an alternate embodiment, the clock scaler/selector could operate as a pure clock selector if the data output from progressive counter 47 is applied to the select input of clock scaler/selector 45. In its clock selector operating mode, the clock scaler/selector 45 functions as a multiplexer for selecting one of a plurality of sets of input clock signals to be output at 57 for use as PARCUT clock signals. The set of clock signals is selected by the select input of clock scaler/selector 45, as received from the data output of progressive counter 47. Thus, if the data output of progressive counter 47 is 63, then the PARCUT clocks output at 57 from clock scaler/selector 45 might be 100 MHz, 80 MHz and 60 MHz, for example. Similarly, if the data output of progressive counter 47 is 32, then those same PARCUT clocks output from clock scaler/selector 45 would be 50 MHz, 40 MHz and 30 MHz, respectively. If the data output of progressive counter 47 is 16, then those same PARCUT clock signals would have frequencies of 25 MHz, 20 MHz and 15 MHz, respectively.

Although both the clock scaling function and the clock selecting function of clock scaler/selector 45 are illustrated in FIG. 4, the clock scaler/selector 45 need only be capable of performing one of those functions. If the clock scaling function is to be utilized, then the select input of clock scaler/selector 45 can be eliminated. Similarly, if the clock selecting function is to be utilized, then the duty cycle meter 45 and the modulate input of clock scaler/selector 45 can be eliminated.

Referencing the temperature circuit 49 of FIG. 4, this exemplary circuit includes a temperature diode which turns on at the desired threshold temperature $T_{OK}$ (see FIG. 6). Thus, when the CPU die temperature exceeds the threshold $T_{OK}$, the overheat signal from temperature sensing circuit 49 becomes active by operation of the temperature diode.

With reference to the counter circuits utilized in the duty cycle meter 43, the progressive counter 47 and the activity meter 53, it may be possible to further reduce the effective transition frequency of the data processing system 20 by using reflected code (Gray code) counters which require only 1 bit transition to change between count states.

It will also be appreciated that the resolution of the progressive PARCUT clock frequency adjustments along the line 87 in FIG. 5 can be increased or decreased as desired by correspondingly increasing or decreasing the number of bits in the counters of the progressive counter 47 and the duty cycle meter 43.

As shown in FIG. 4, the clock signals utilized by the system components external to the CPU 21 can also be obtained from the clock scaler/selector 45 in the same manner as described above with respect to the PARCUT clocks utilized internally by CPU 21. Thus, the CPU-driven clock frequency control provided by the PARCUT controller 31 can be extended as desired to system clock signals external to CPU 21. In addition, the clock arbiter 51 can disable selected ones of the buffer/drivers 63 to shut off selected system clocks corresponding to system components that have been idle for a sufficiently long time. This idle time information is provided to clock arbiter 51 in the form of a system activity status input 67 which CPU 21 can obtain by reading an activity status register of an activity meter such as shown at 17 in FIG. 1.

FIG. 4 also illustrates another way to apply the concept of PARCUT controller 31 to clock signals external to CPU 21 in data processing system 20. In this approach, the clock arbiter 51 provides the FU stat signal to a CPU status/PARCUT register 55 via bus 89. The register 55 is available to be read by system components which are external to CPU 21, thus permitting such external system components to receive information about the activity of the CPU. For example, the register 55 could be read by any of the peripherals 23, 25, 27 and 29 in the data processing system of FIG. 2. If the peripheral is also provided with a clock arbiter 51, progressive counter 47, duty cycle meter 43, clock divider 41 and clock scaler/selector 45, then the PARCUT concept described above with respect to CPU 21 can be extended to any desired component of the data processing system 20 in order to realize a low power data processing system according to the above-described PARCUT principles.

It should be evident that the above-described PARCUT controller 31 provides, by clock frequency control, a power management approach which is progressive, adaptive, reliable, CPU-driven, and user-transparent. The approach allows high performance and low power operation to coexist in a microprocessor, and provides a microprocessor which automatically responds to the system demand without hardware/software intervention and the associated overhead. This permits a high performance microprocessor to be provided in a low cost package such as a plastic quad flat package (PQFP). The feedback of performance and temperature information allows adaptive control with little overhead. The progressive clock frequency adjustment and adaptive control of the invention provide an advantageous balance between peak performance and power conservation. Moreover, by making the PARCUT clocks and/or the CPU status available at the microprocessor pinouts for use by the external system components, the present invention further allows high performance and low power operation to coexist in a data processing system.

Although exemplary embodiments of the present invention are described above, this does not limit the scope of the invention, which can be practiced in a variety of embodiments.

What is claimed is:

1. A single chip data processing device, comprising:
   at least one functional unit for performing data processing operations; and
   a power management unit for managing power consumption of said data processing device, including
      an activity meter connected to said functional unit for generating an activity level signal corresponding an activity level of said functional unit independently of off-chip information,
      a clock arbiter connected to said activity meter receiving said activity level signal, said clock arbiter having three states including an up state, a hold state and a down state, said clock arbiter progressing from said up state to said hold state and from said hold state to said down state when said activity level signal indicates activity below a predetermined activity threshold, said clock arbiter progressing from said down state to said hold state and from said hold state to said up state when said activity level signal indicates activity above said predetermined activity threshold, and
      a clock generating circuit connected to said clock arbiter and supplying at least one clock signal to the single chip data processing device, said clock generating circuit supplying said at least one clock signal periodically increasing in frequency responsive to said up state, supplying said at least one clock signal at a unchanging frequency responsive to said hold state and supplying said at least one clock signal periodically decreasing in frequency responsive to said down state.

2. The single chip data processing device of claim 1, wherein:
   said at least one functional unit includes a floating point unit (FPU).

3. The single chip data processing device of claim 1, wherein:
   said at least one functional unit includes an integer unit (IU).

4. The single chip data processing device of claim 1, wherein:
   said activity meter includes a saturating up counter periodically advancing a count toward a saturation value, said count reset upon access for use of one of said at least one functional units, said count forming said activity level signal.

5. The single chip data processing device of claim 1, wherein:
   said clock arbiter further includes a reset input for receiving a reset signal and a stop clock input for receiving a stop clock signal, said clock arbiter entering a maximum state responsive to said reset signal, entering a minimum state responsive to said stop clock signal and progressing from said maximum state to said hold state when said activity level signal indicates activity below said predetermined activity threshold; and
   said clock generating circuit supplying said at least one clock signal at a maximum frequency responsive to said maximum state and supplying said at least one clock signal at a minimum frequency responsive to said minimum state.

6. The single chip data processing device of claim 5, further comprising:
   a temperature sensor sensing temperature of said single chip data processing device and generating an overheat signal when the temperature of said single chip data processing device exceeds a predetermined temperature; and
   said clock arbiter is connected to said temperature sensor and further includes a overheat input for receiving said overheat signal, said clock arbiter progressing from said maximum state to said hold state, from said up state to said hold state and from said hold state to said down state in response to receipt of said overheat signal.

7. The single chip data processing device of claim 1, further comprising:

a temperature sensor sensing temperature of said single chip data processing device and generating an overheat signal when the temperature of said single chip data processing device exceeds a predetermined temperature; and said clock arbiter is connected to said temperature sensor and further includes a overheat input for receiving said overheat signal, said clock arbiter progressing from said up state to said hold state and from said hold state to said down state in response to receipt of said overheat signal.

8. The single chip data processing device of claim 1, wherein:

said clock generating circuit includes
- a clock signal input receiving an input clock signal,
- a progressive counter connected to said clock arbiter, said progressive counter periodically counting up toward a maximum count responsive to said up state, maintaining a first count responsive to said hold state and periodically counting down toward a minimum count responsive to said down state,
- a duty cycle meter circuit connected to said progressive counter for periodically receiving said first count, said duty cycle meter having a second counter storing a second count and outputting a modulate signal during intervals when said second count is less than said first count, and
- a clock selection circuit connected to said clock signal input and said duty cycle meter circuit generating said at least one clock signal corresponding to said input clock signal only on receipt of said modulate signal.

9. A method of managing power consumption of a single chip data processing device having at least one functional unit, comprising the steps of:

generating an activity level signal corresponding to an activity level of the at least one functional unit of the data processing device to perform data processing operations;

assuming one power level state selected from a group including an up state, a hold state and a down state;

progressing from said up state to said hold state when said activity level signal indicates activity below a predetermined threshold;

progressing from said hold state to said down state when said activity level signal indicates activity below said predetermined threshold;

progressing from said down state to said hold state when said activity level signal indicates activity above a predetermined threshold;

progressing from said hold state to said up state when said activity level signal indicates activity above said predetermined threshold;

supplying a clock signal to the single chip data processing device periodically increasing in frequency responsive to said up state;

supplying a clock signal to the single chip data processing device unchanged in frequency responsive to said hold state; and supplying a clock signal to the single chip data processing device periodically decreasing in frequency responsive to said down state.

10. The method of managing power consumption in a single chip data processing device of claim 9, wherein:

said step of generating an activity level signal includes
- advancing an activity level count periodically toward a saturation value,
- resetting said activity level count upon access for use of one of said at least one functional units, and
- wherein said activity level count forms said activity level signal.

11. The method of managing power consumption in a single chip data processing device of claim 9, wherein:

said power level state further includes maximum state and a minimum state;

entering said maximum state upon receipt of a reset signal;

intering said minimum state upon receipt of a stop clock signal; and progressing from said maximum state to said hold state when said activity level signal indicates activity below said predetermined activity threshold.

12. The method of managing power consumption in a single chip data processing device of claim 9, further comprising:

sensing a temperature of the single chip data processing device;

generating an overheat signal when the sensed temperature of the single chip data processing device exceeds a predetermined temperature;

progressing from said up state to said hold state in response to receipt of said overheat signal; and progressing from said hold state to said down state in response to receipt of said overheat signal.

* * * * *